United States Patent [19]

Ritter, Jr.

[11] 4,191,073

[45] Mar. 4, 1980

[54] DRIVE ASSEMBLY HAVING AN IMPROVED SUN GEAR MOUNTING

[75] Inventor: Arthur J. Ritter, Jr., Metamora, Ill.

[73] Assignee: Caterpillar Tractor Co., Peoria, Ill.

[21] Appl. No.: 800,825

[22] Filed: May 26, 1977

[51] Int. Cl.² ............................................... F16H 57/10
[52] U.S. Cl. .......................................... 74/764; 74/801
[58] Field of Search ............... 74/764, 391, 410, 801; 180/43 B, 65 F, 66 F, 70 R

[56] References Cited

U.S. PATENT DOCUMENTS

| | | | |
|---|---|---|---|
| 3,452,612 | 7/1969 | Casey | 74/801 X |
| 4,082,156 | 4/1978 | Krolak et al. | 180/70 R X |

*Primary Examiner*—C. J. Husar
*Assistant Examiner*—Frank McKenzie
*Attorney, Agent, or Firm*—Wegner, Stellman, McCord, Wiles & Wood

[57] ABSTRACT

A drive assembly having a drive shaft rotatably carried in a support for rotation about an axis thereof. An output sprocket is carried on a first carrier of the drive assembly to be driven from the drive shaft by means of a gear assembly including a plurality of sun gears and planetary gears. The second of the planetary gears is rotatably mounted to the carrier. The first sun gear is locked against rotation relative to the drive shaft. The locking structure includes a carrier for carrying one set of the planetary gears and having locking structure cooperating with complementary locking structure on the second sun gear.

4 Claims, 4 Drawing Figures

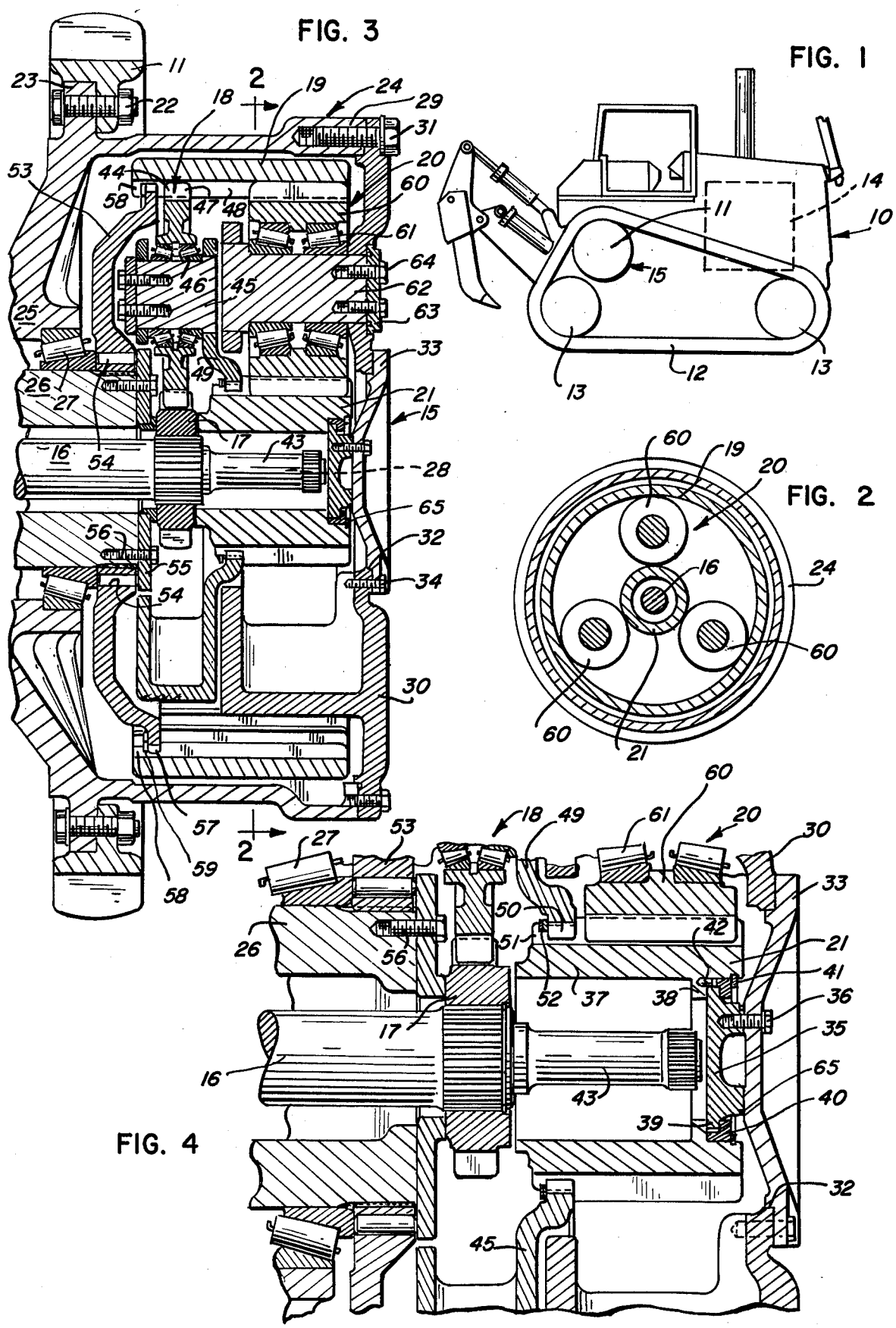

DRIVE ASSEMBLY HAVING AN IMPROVED SUN GEAR MOUNTING

BACKGROUND OF THE INVENTION

1. Field of the Invention

This invention relates to drive assemblies and in particular to means for mounting a sun gear in a drive assembly.

2. Description of the Prior Art

It has heretofore been conventional to provide a drive gear assembly including a plurality of sun gears and planetary gears in the final drive of a vehicle, such as a tractor, wherein an input driver shaft driven by the vehicle engine is connected to an output sprocket for driving the track of the vehicle. It has been conventional to mount the sun gears of the gear assembly on the drive shaft. Such arrangement has heretofore presented problems in the wear of the second of the sun gears because of twisting thereof relative to the outer housing of the drive assembly carrying the driven sprocket. Such twisting occurs commonly as the result of loads applied thereto by the track and has presented a particularly vexatious problem in such tractor vehicles.

SUMMARY OF THE INVENTION

The present invention comprehends an improved drive assembly wherein the second sun gear is rotatably carried by the housing and locked for rotation with the drive shaft by means permitting the second sun gear to move with the housing under the twisting loads applied thereto by the track.

In the illustrated embodiment, the housing is defined by a carrier having an opening aligned with the axis of the drive shaft. A cover is secured to the carrier to overlie the opening and is provided with a suitable retainer for rotatably mounting the second sun gear coaxially of the drive shaft thereto.

The second sun gear may be retained against axial displacement relative to the retainer by suitable shoulder means on the second sun gear and retainer, respectively. In the illustrated embodiment, at least one of the shoulder means comprises a removable locking ring.

The second sun gear may be retained against rotation relative to the first planetary gear assembly by means of an extension of the carrier for the first planetary gear assembly having meshed association with the second sun gear. This portion of the planetary gear carrier may be retained against axial displacement relative to the second sun gear by suitable cooperating shoulder means on the carrier and second sun gear, and in the illustrated embodiment, including a removable locking ring.

A relatively loose connection may be provided between the second planetary gears and the second sun gear, whereas the connection between the first planetary gear carrier and the second sun gear is relatively rigid. Thus, the first planetary gear carrier tends to move with the distorted carrier as a result of the relatively rigid connection between the second sun gear and the first planetary gear carrier.

Thus, the drive assembly of the present invention is extremely simple and economical of construction while yet providing an improved long life, low maintenance assembly providing a highly advantageous improvement in the tractor vehicle drive art.

BRIEF DESCRIPTION OF THE DRAWING

Other features and advantages of the invention will be apparent from the following description taken in connection with the accompanying drawing wherein:

FIG. 1 is a side elevation of a tractor vehicle having a drive assembly embodying the invention;

FIG. 2 is a schematic vertical section taken substantially along the line 2—2 of FIG. 3, illustrating the arrangement of the second sun gear and second planetary gears relative to the outer ring gear and housing carrier;

FIG. 3 is a fragmentary diametric section of the drive assembly embodying the invention; and FIG. 4 is a fragmentary enlarged diametric section thereof.

DESCRIPTION OF THE PREFERRED EMBODIMENT

In the exemplary embodiment of the invention as disclosed in the drawing, a vehicle generally designated 10 illustratively comprises a tractor vehicle having a drive sprocket 11 for driving a track 12 which is further entrained over a pair of guide sprockets 13. The vehicle may be provided with a suitable engine 14.

The present invention is concerned with the final drive assembly generally designated 15 for driving the sprocket 11 from a drive shaft 16 driven from the engine 14. In the illustrated embodiment, the final drive assembly 15 comprises a double reduction final drive assembly utilizing a first sun gear 17 secured to the drive shaft 16 for rotation therewith, a first planetary gear assembly generally designated 18 in meshed driving association with the first sun gear 17, an outer ring gear 19 in meshed driven association with the first planetary gear assembly 18, a second planetary gear assembly 20 in meshed driven association with the outer ring gear 19, and a second sun gear 21 in meshed driven association with the second planetary gear assembly 20. The present invention is concerned with the mounting of the second sun gear in the drive assembly to provide an improved, low cost, low maintenance assembly.

More specifically, sprocket 11 is secured by means of suitable bolts 22 to a flange 23 of a housing carrier generally designated 24. The carrier includes an inner portion 25 rotatably journaled on a hub 26 by suitable roller bearings 27 for rotation relative to shaft 16 about the axis 28 of the shaft.

As best seen in FIG. 3, carrier 24 further defines an axially outer annular end portion 29 across which is secured an end plate 30 by means of suitable bolts 31. The carrier end plate further defines an axial opening 32 across which is secured a removable cover 33 by means of suitable screws 34.

A retainer 35 is removably secured to cover 33, with a coaxial annular seal 65 therebetween by suitable screws 36 for rotatably supporting the second sun gear 21, as best seen in FIG. 4 of the drawing. More specifically, as shown therein, the hub 37 of second sun gear 21 is provided with an inturned flange 38 slidably engaging an outturned flange 39 on the retainer 35. An L-section slide ring 40 is secured to the second sun gear 37 by a suitable removable locking ring 41 and pin 42 for cooperating with flanges 38 and 39 in providing rotatable axially fixed mounting of the second sun gear to the retainer 35 and thusly to the carrier 24. As shown in FIG. 4, the second sun gear is thusly cantilevered from the retainer portion 35 of carrier 24 to extend coaxially rotatably about the inner end 43 of the drive shaft 16. As further shown in FIG. 4, the retainer 35 is spaced coaxially outwardly of the drive shaft end 43.

Referring now more specifically to FIG. 3, the first planetary gear assembly 18 includes 3 planetary gears 44 spaced 120° apart about the axis 28 of shaft 16 on a suitable carrier 45. The individual first planetary gears 44 are rotatably mounted to the carrier 45 by suitable roller bearings 46 and each of the gears is provided with teeth 47 meshing with the inner teeth 48 of outer ring gear 19.

As further shown in FIGS. 3 and 4, carrier 45 includes a flange portion 49 having a spline portion 50 splined to a corresponding spline portion 51 of the second sun gear 21 and retained against axial displacement therewith by a suitable removable locking ring 52. The spline connection between portions 50 and 51 is relatively rigid and, thus, the first planetary gear assembly 18 tends to move with the housing carrier 24 as a result of the relatively rigid connection of the second sun gear to the carrier 24, as discussed above.

As further shown in FIG. 3, a second hub 53 is mounted to first hub 26 by suitable pin means 54, a locking ring 55, and screws 56. Hub 53 includes an outer spline portion 57 splined to a corresponding inner spline portion 58 of outer ring gear 19, with the spline portion 57 being retained against axial displacement relative to the outer ring 19 by suitable locking ring 59.

The arrangement of the second planetary gear assembly 20 and second sun gear 21 within the housing carrier 24 is schematically illustrated in FIG. 2. Thus, as shown therein, the second planetary gear assembly 20 includes three planetary gears 60 rotatably carried by suitable roller bearings 61 on carrier end plate 30 by means of a third carrier 62 secured to the end plate by a retainer 63 and bolts 64. As schematically shown in FIG. 2, the second planetary gears 60 may be spaced 120° apart in meshed association inwardly with the second sun gear 21 and outwardly with the outer ring gear 19 coaxially of the shaft 16 within the housing carrier 24 in a manner generally similarly to the relationship of the first planetary gears 44 to the first sun gear 17, outer ring gear 19, and carrier 24.

Thus, in the drive assembly 15, the first planetary gears 44 effectively move with second sun gear 21 so as to have movement relative to first sun gear 17 as a result of twisting of the carrier 24 as by the loads on track sprocket 11. The second planetary gears 60 may have movement relative to the second sun gear. The outer ring gear may have movement to each of the other gears of the drive assembly. Thus, the second sun gear is effectively rotatable with the shaft 16 while yet having movement relative to the shaft 16 so as to prevent the problems arising in the prior art structures wherein the second sun gear was mounted to the drive shaft. Resultingly, the drive assembly of the present invention provides a long, trouble-free life affording a substantial improvement in the vehicle drive assembly art in an extremely simple and economical manner.

In summary, the drive assembly 15 is driven from a suitable driver shaft 16 rotatably carried for rotation about its axis 28 in a hub support 26. The output sprocket 11 is carried by a first carrier 24 which is rotatably carried coaxially of the drive shaft. The gear assembly 15 includes a first sun gear 17 rotatable with the shaft about the axis 28, a second carrier 45, a plurality of first planetary gears 44 rotatably carried by the second carrier and driven by the first sun gear 17, an outer, fixedly disposed ring gear 19 coaxially of shaft 28 in meshed association with the first planetary gears 44, a second sun gear 21, a plurality of second planetary gears 60 rotatably mounted to the carrier 24 and meshed with the outer ring gear 19 and the second sun gear 21, and means for rotatably mounting the second sun gear 21 to the carrier 24 coaxially of the shaft end 43. The resultant isolation of twisting stresses developed by operation of the vehicle track provides a substantially improved, maintenance-free long life of the drive assembly.

The foregoing disclosure of specific embodiments is illustrative of the broad inventive concepts comprehended by the invention.

The embodiments of the invention in which an exclusive property or privilege is claimed are defined as follows:

1. In a drive assembly having a driver shaft rotatably carried in a support for rotation about an axis, an output sprocket carried by a first carrier rotatably carried coaxially of said shaft, and a gear assembly for driving the carrier from the shaft including a first sun gear rotatable with said shaft about said axis, a second carrier, a plurality of first planetary gears on said second carrier driven by said sun gear, an outer ring fixedly disposed coaxially of said shaft in meshed association with said first planetary gears, a second sun gear, and a plurality of second planetary gears rotatably mounted to said first carrier and meshed with said outer ring gear and second sun gear, the improvement comprising:
mounting means for rotatably mounting the second sun gear to said first carrier coaxially of said shaft; and
seal means for sealing said second sun gear mounting means to said first carrier.

2. In a drive assembly having a driver shaft rotatably carried in a support for rotation about an axis, an output sprocket carried by a first carrier rotatably carried coaxially of said shaft, and a gear assembly for driving the carrier from the shaft including a first sun gear rotatable with said shaft about said axis, a second carrier, a plurality of first planetary gears on said second carrier driven by said sun gear, an outer ring fixedly disposed coaxially of said shaft in meshed association with said first planetary gears, a second sun gear, and a plurality of second planetary gears rotatably mounted to said first carrier and meshed with said outer ring gear and second sun gear, the improvement comprising
mounting means for rotatably mounting the second sun gear to said first carrier coaxially of said shaft, said first carrier including a removable cover plate spaced axially from an end of said shaft, and a retainer removably secured to said cover plate, said second sun gear being rotatably carried by said retainer.

3. In a drive assembly having a driver shaft rotatably carried in a support for rotation about an axis, an output sprocket carried by a first carrier rotatably carried coaxially of said shaft, and a gear assembly for driving the carrier from the shaft including a first sun gear rotatable with said shaft about said axis, a second carrier, a plurality of first planetary gears on said second carrier driven by said sun gear, an outer ring fixedly disposed coaxially of said shaft in meshed association with said first planetary gears, a second sun gear, and a plurality of second planetary gears rotatably mounted to said first carrier and meshed with said outer ring gear and second sun gear, the improvement comprising:

mounting means for rotatably mounting the second sun gear to said first carrier coaxially of said shaft; and cooperating means on said second sun gear, said first carrier and said second carrier for preventing axial displacement of said second sun gear, said first carrier including a removable cover plate spaced axially from an end of said shaft and a retainer removably secured to said cover plate, said second sun gear being rotatably carried by said retainer.

4. The drive assembly of claim 3 wherein said cooperating means includes removable locking means carried by said second sun gear.

* * * * *